DUPLICATING MASTER SHEETS

Filed March 22, 1965

INVENTOR

ALFRED E. BLOCK

BY Irwin S. Thompson

ATTY.

United States Patent Office 3,289,579
Patented Dec. 6, 1966

3,289,579
DUPLICATING MASTER SHEETS

Alfred Ernest Block, Bourne End, England, assignor to Block and Anderson Limited, London, England, a British company Filed Mar. 22, 1965, Ser. No. 441,817
Claims priority, application Great Britain, Mar. 8, 1961, 8,508/61
8 Claims. (Cl. 101—149.4)

Figure 1A:
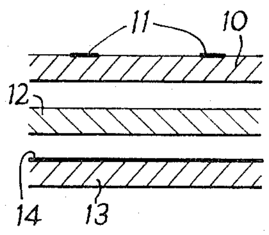

This invention relates to methods of and arrangements for producing duplicating master sheets and the like by means of heat derived from the absorption of electromagnetic radiation, particularly radiation in the infra-red region of the spectrum, by the usually readable image-forming areas of an original from which the desired duplicating master sheet is required to be produced in order, subsequently, to effect multiple copying by a convenient process such as a spirit duplicating, lithographic, hectographic or chemical reactive process and is a continuation-in-part of my earlier U.S. Patent No. 3,183,833, issued May 18, 1965, for Duplicating Master Sheets.

Various methods utilizing heat generation by absorption of infra-red radiation have already been proposed for effecting the above defined production of duplicating master sheets and these include the subjection to infra-red radiation of a sheet assemblage comprising the image-bearing original in contact with one side of a transfer sheet containing, or coated with, a transfer material which is normally solid but which becomes flowable and displaceable at an elevated temperature and a receptive, master-forming, sheet in contact with the opposite side of said transfer sheet. Said oposite side of the transfer sheet is the coated side when the sheet is of coated, as distinct from impregnated, form. Consequent upon such irradiation, heat generated within the radiation absorptive image regions of the original is transmitted to corresponding localised regions of the transfer sheet lying in contact with the receptive sheet and the now-flowable material of such transfer sheet becomes transferred to the contact receptive sheet to form the requisite image areas of the latter. The transferred material is arranged to have a character suited to the particular duplicating process with which the prepared master sheet is to be employed. Thus, for example, the transferred material may include an alcohol soluble dye in the case of spirit duplicating, a water soluble dye in the case of hectographic duplicating or a hydrophobic ink-receptive material in the case of lighographic duplicating.

Among the objects of the present invention are the provision of improved methods and arrangements for the production of such master sheets and which are particularly, although not exclusively, suited to the production of master sheets for use with spirit type duplicators.

In accordance with one aspect of the invention an image-bearing original sheet having at least a part of its visually readable image formed of material which is non-absorptive of the radiation to be employed is, before use, provided with an off-set repeat of the original image or at least those parts which are not radiation absorptive made in material which is absorptive of the said, e.g. infra-red, radiation on the reverse side of the original sheet to that bearing the original image, the receptive sheet, which is eventually to form the duplicating master sheet, being then placed between such image-bearing original sheet, which is arranged in contact with one side of the said receptive sheet, and a suitable coated or impregnated transfer sheet, which is arranged in contact with the other side of said receptive sheet. Such an assemblage is then subjected to a controlled amount of, for example, infra-red radiation. Such radiation may be directed on to the exposed surface of the original sheet. Alternatively, the radiation may be directed on to the exposed surface of the opposite transfer sheet or, in a further alternative method, the radition may be directed on to both the original and the transfer sheets. When irradiation of the transfer sheet is employed its coating or impregnating material must be substantially non-obsorptive of the particular radiation employed.

In accordance with another aspect of the invention, the above mentioned off-set repeat image is formed of material which is not only absorptive of the radiation used but which includes also a material which contains a pigment and is capable of being reduced to flowable condition by heating.

Figure 1B:
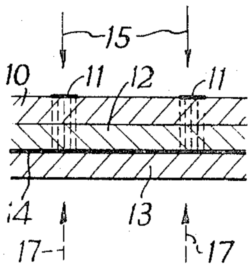
Figure 1C:
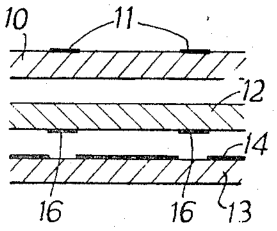

In order that the nature of the invention may be more readily understood, a number of different embodiments thereof will now be described by way of illustrative example and with reference to the accompanying drawing in which:

FIGURES 1(*a*), 1(*b*) and 1(*c*) are mainly diagrammatic sectional views illustrating a known method of forming a duplicating master sheet.

Figure 2A:
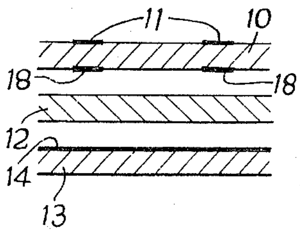
Figure 2B:
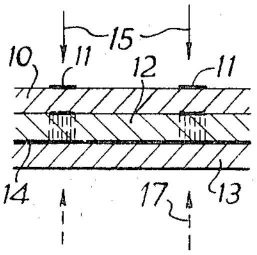
Figure 2C:
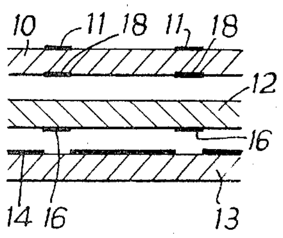
Figures 3A, 3B:
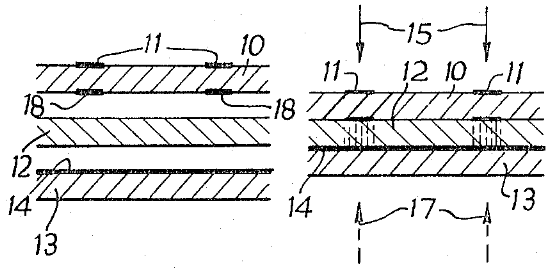
Figure 3C:
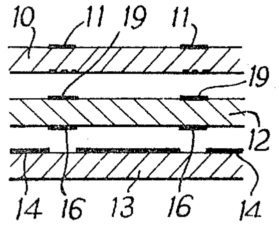

FIGURES 2(*a*), 2(*b*) and 2(*c*) are diagrammatic sectional views, similar to FIGURES 1(*a*), 1(*b*) and 1(*c*), of another arrangement and method, while FIGURES 3(*a*), 3(*b*) and 3(*c*) are further diagrammatic sectional views showing an arrangement and method according to the invention.

Referring first to FIGURE 1(*a*), 10 indicates an original comprising a paper or like sheet bearing visually readable image zones 11, e.g. typed characters, printed matter, ruled lines, or a drawing outline, formed of material, such as a carbon pigmented ink, which is appreciably absorptive or infra-red radiation. 12 indicates a receptive sheet made of a material whose character is suited to form the base material of the eventual duplicating master sheet, while 13 indicates a transfer or carbon sheet which may be impregnated with or, as shown, provided with a coating layer 14 of a transferable material which is fusible and displaceable at elevated temperatures and which contains, as an essential constituent, a spirit or water soluble dye, a hydrophobic ink-receptive substance or a chemically reactive substance chosen in accordance with the particular duplicating process in which the desired master is eventually to be used. The three component sheets are brought together in intimate face-to-face relationship as shown in FIGURE 1(*b*), whereby the image-bearing surface of the original sheet 10 faces outwardly away from the receptive sheet 12 while the coating layer 14 of the transfer sheet 13 lies adjacent the receptive sheet 12. Whilst maintained in this closely contacting relationship by any suitable means, the assemblage is subjected in infra-red radiation directed on to the side of the image-bearing surface of the original sheet 10, as indicated by the arrows 15. Heat generated in the image zones 11 by absorption of the radiation is conducted through the sheet 10 and then through the sheet 12 in contact therewith to the material of the coating layer 14, whereby the latter melts and is displaced on to, or into, the adjacent surface of the receptive sheet 12 over zones which substantially coincide with those defined by the image zones 11.

After separation of the component sheets as indicated in FIGURE 1(*c*), the receptive sheet 12 now carries a mirror image copy 16 of the original image zones 11 formed of the transfer material of the layer 14, and is suitable for use as a spirit, lithographic or chemically reactive master.

For the formation of a master suitable for application to a hectographic gelatine pad or roller, a broadly similar arrangement may be used but in this instance the original 10 is inverted so as to place the image zones 11 on the underside and directly in contact with the adjacent surface of the receptive sheet 12.

Instead of applying the infra-red radiation on to the surface of the original 10 as indicated by the arrows 15, such radiation may be directed on to the transfer sheet 14 as indicated by the arrows 17 provided the material of the coating layer 14 is substantially non-absorptive of the radiation employed. Such application of radiation on to the transfer sheet may be additional to that directed on to the original sheet as shown by the arrows 15.

The above described known method and arrangement is wholly dependent upon the visually readable image zones 11 being of material which is appreciably absorptive of the radiation, e.g., infra-red radiation, employed. If such image zones 11 are for any reason non-absorptive or substantially non-absorptive of the radiation employed, no or very little heat will be generated in such image zones and there will not be any melting of the transfer material of the layer 14 and no image copy 16 will be produced. Such non-absorption is likely to arise when the image zones 11 are formed from certain coloured pigment materials and coloured inks.

Referring now to FIGURES 2(*a*), 2(*b*) and 2(*c*), these illustrate another arrangement and method capable of providing useful results in the case where the original 10 is of a form in which some or all of the visually readable image zone 11 are formed of material which is not absorptive or is substantially non-absorptive of the radiation employed and are provided by an impression method, e.g. by means of a typewriter. In this re-arrangement an off-set repeat of the image zones 11 in material which is strongly absorptive of the radiation used is provided on the reverse side of the original, as indicated at 18, as by placing a suitable carbon or like transfer sheet in face-to-face relationship with the reverse side of the original sheet before the impression of the image, as by means of a typewriter. The various sheets are then assembled, as shown in FIG. 2(*b*), in a relationship to one another similar to that already described with reference to FIGURE 1(*b*), so that the off-set repeat zones 18 are in direct contact with the facing surface of the middle or receptive sheet 12. Upon subjection to, e.g. infra-red radiation, for instance as shown by the arrows 15 and/or by the arrows 17, the off-set repeat zones 18 become heated by absorption of the radiation and provides heat for conduction through the thickness of the receptive sheet 12 to the coating layer 14 of the transfer sheet 13 whereby, as before, the material of such coating layer is reduced to flowable condition over zones which conform substantially in shape to those of the zones 18 with the result that the coating material is displaced on to or into the receptive sheet 12. In addition to providing the all essential volume of heat generating material on the original sheet to compensate for the lack of such characteristic in the image zones 11, the off-set repeat image zones 18 are substantially nearer to the material of the coating layer 14 which is to be reduced to flowable condition by the heat generated. Thus the whole of or certain parts of the original image zones 11 may be formed of material which is either completely non-absorptive or is only very poorly adsorptive of the radiation used and this is of major advantage when the original 10 is required for use also as, say, a record or reference sheet and when, for such further use, it is desirable to have the whole of or certain parts of the original image in coloured pigments which have little or no radiation absorptive properties.

An arrangement and method in accordance with this vention is illustrated in FIGURES 3(*a*), 3(*b*) and 3(*c*). In this the original sheet 10 is provided, as in FIGURE 2, with visually readable image zones 11 in material of non-absorptive character on one side and further off-set repeat zones 18 in strongly absorptive material on the reverse side, but in this instance such repeat zones 18 are formed of material which is not only absorptive of the radiation used, but which also carries a suitable pigment and is capable of being reduced to flowable condition by heating. After preparation of the modified original in such manner the respective sheets are assembled as shown in FIGURE 3(*b*) with the receptive sheet 12 in between the original sheet 10 and the transfer sheet 13, the off-set repeat zones 18 being in direct contact with one side of the receptive sheet 12 and the coating layer 14 being in contact with the opposite side of such sheet 12. After exposure to suitable, i.g. infra-red, radiation on either or both sides as indicated by the arrows 15 and 17, the transfer coating material 14 is displaced as before on to the underside of the receptive sheet 12 to form a duplicating master image while at least some of the material of the off-set repeat zones 18 is displaced on to the adjacent upper surface of the receptive sheet 12, to form a correct reading image 19 of the master duplicating image 16 is provided on the opposite side. Such image 19 is of great value for ready identification and visual interpretation of the contents of the master and facilitates accurate placing of the master in certain types of duplicating and like machines. It may, of course, be multi-coloured if suitably different materials are employed for the formation of the off-set image zones.

Instead of employing a transfer sheet having a discrete coating layer of transfer material on one surface thereof it is, of course, possible to employ a transfer sheet which is impregnated throughout with an appropriate transfer material.

The materials employed for the various sheets and the heat sensitive transfer material may be of any suitable and well known form.

For preparation of a spirit or hectographic duplicating master, the heat sensitive transfer material for forming the coating layer 14 or for impregnating a suitably porous fibrous sheet may be a mixture of a wax with a spirit or water soluble dye. One example of a wax suitable material for spirit duplicating master formation is wax 13%, oil 33%, crystal violet 54%, all by weight.

For preparation of a chemically reactive type of duplicating master, the heat sensitive transfer material may be a mixture of a suitable wax with a chemical reagent which will react with another reagent to produce black or some other colour. One example of a suitable material for chemically reactive duplicating master formation is wax 24%, oil 16%, $NiCl_2 \cdot 6H_2O$ 60%, all by weight.

For the preparation of a lithographic type of duplicating master, the heat sensitive transfer material may be an oleaginous material such as paraffin wax with or without a dye or pigment or other litho type inks.

I claim:

1. The method of producing a mirrorscript duplicating master or like sheet from a sheet bearing an original image which is non-absorptive of infra-red radiation, which comprises the steps of providing an off-set repeat of the original image in heat sensitive pigment-containing material which is absorptive of infra-red radiation on the side of said original sheet opposite to that carrying the original image, placing a receptive sheet of material suitable for forming the base of the produced master sheet between the image-bearing original sheet and a transfer sheet of heat sensitive transfer material of a character suitable for forming the duplicating master image, the side of said original sheet carrying said off-set repeat of the original image being in contact with one side of said receptive sheet and the heat sensitive transfer material of said transfer sheet being in contact with the opposite side of said receptive sheet, maintaining said sheets in face-to-face contact with one another while subjecting them to infra-red radiation of an amount sufficient to cause melting and displacement of said off-set image material and said transfer material to opposite sides of said receptive sheet by heat from said off-set repeat of the original image upon heating of such off-set repeat image by absorption of said radiation and then removing said receptive sheet for use as the required duplicating master sheet.

2. The method according to claim 1 in which said infra-red radiation is directed on to the exposed surface of said original image-bearing sheet.

3. The method according to claim 1 in which the heat sensitive transfer material of said transfer sheet is substantially non-absorptive of said infra-red radiation and in which said radiation is directed on to the exposed surface of said transfer sheet.

4. The method according to claim 3 in which said infra-red radiation is also directed to the exposed surface of said original image-bearing sheet.

5. The method of producing a hectographic spirit duplicating master or like sheet from a sheet bearing an original image in material non-absorptive of infra-red radiation, which comprises the steps of providing an off-set repeat of the original image in heat sensitive pigment-containing material which is absorptive of infra-red radiation on the side of said original sheet opposite to that carrying the original image, placing a receptive sheet of material suitable for forming the base of the produced master sheet between the image-bearing original sheet and a transfer sheet of heat sensitive transfer material including an alcohol-soluble pigment, the side of said original sheet carrying said off-set repeat of the original image being in contact with one side of said receptive sheet and the heat sensitive transfer material of said transfer sheet being in contact with the opposite side of said receptive sheet, maintaining said sheets in face-to-face contact with one another while subjecting them to infra-red radiation of an amount sufficient to cause melting and displacement of said off-set image material and said transfer material to opposite sides of said receptive sheet by heat from said off-set repeat of the original image upon heating of such off-set repeat image by absorption of said radiation and then removing said receptive sheet for use as the required duplicating master sheet.

6. The method according to claim 5 in which said infra-red radiation is directed on to the exposed surface of said original image-bearing sheet.

7. The method according to claim 5 in which the heat sensitive transfer material of said transfer sheet is substantially non-absorptive of said infra-red radiation and in which said radiation is directed on to the exposed surface of said transfer sheet.

8. The method according to claim 7 in which said infra-red radiation is also directed to the exposed surface of said original image-bearing sheet.

References Cited by the Examiner

UNITED STATES PATENTS

| | | | |
|---|---|---|---|
| 2,118,888 | 5/1938 | Lewis et al. | 101—149.4 |
| 2,954,311 | 9/1960 | VanderWeel | 101—149.5 |
| 3,122,998 | 3/1964 | Raczynski et al. | 101—149.4 X |
| 3,151,550 | 10/1964 | Newman | 101—149.4 |
| 3,183,833 | 5/1965 | Block | 101—149.4 |

ROBERT E. PULFREY, *Primary Examiner.*

J. A. BELL, *Assistant Examiner.*